March 18, 1958  G. MUHLER  2,827,258
WEIGHT OPERATED VALVE
Filed Oct. 6, 1955  2 Sheets-Sheet 1

George Muhler
INVENTOR.

BY *Clarence A. O'Brien*
and *Harvey B. Jacobson*
Attorneys

March 18, 1958   G. MUHLER   2,827,258
WEIGHT OPERATED VALVE
Filed Oct. 6, 1955   2 Sheets-Sheet 2

George Muhler
INVENTOR.

BY

U̇nited States Patent Office 2,827,258
Patented Mar. 18, 1958

2,827,258

WEIGHT OPERATED VALVE

George Muhler, Philadelphia, Pa.

Application October 6, 1955, Serial No. 538,899

4 Claims. (Cl. 251—72)

This invention relates in general to new and useful improvements in valve construction, and more specifically to an improved weight operated valve.

The primary object of this invention is to provide a weight operated valve of the type utilized in conjunction for automatically filling containers, the weight operated valve being provided with an operating lever so mounted whereby when the container is removed from the operating lever, or the container is filled with water to the desired point, the operating lever automatically moves the valve to a closed position, and during an intermediate condition of the container, the operating lever moves the valve to an opened position.

Another object of this invention is to provide an improved weight operated valve which includes a pair of fulcrums mounted on opposite sides of the axis of the valve member, the fulcrums being so spaced with respect to a valve seat whereby an operating lever slidably resting thereupon will retain a valve member in a closed position when the operating lever is pivoted on one of the fulcrums and will retain it in open position when seated on both of the fulcrums.

Still another object of this invention is to provide an improved weight operated valve, the valve including a supply pipe having mounted therein a valve seat and a valve member, there being carried by the lower end of the supply pipe a spout, the spout providing supports for a pair of fulcrums on which there is mounted an operating lever for the valve member.

A further object of this invention is to provide an improved valve member of the weight operated type, the valve member including an operating lever for effecting operation thereof, there being carried by the operating lever latch means for selectively retaining the operating lever in either a valve opening or a valve closing position.

Figure 1:
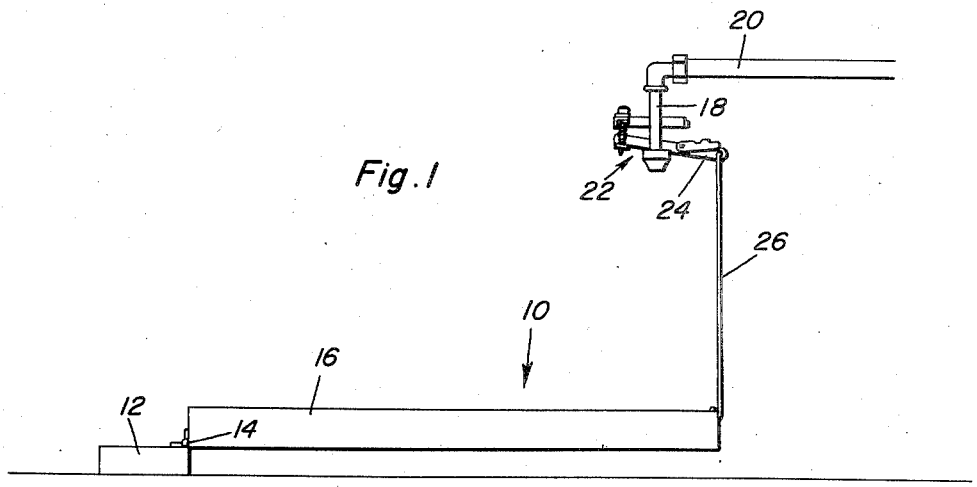
Figure 4:
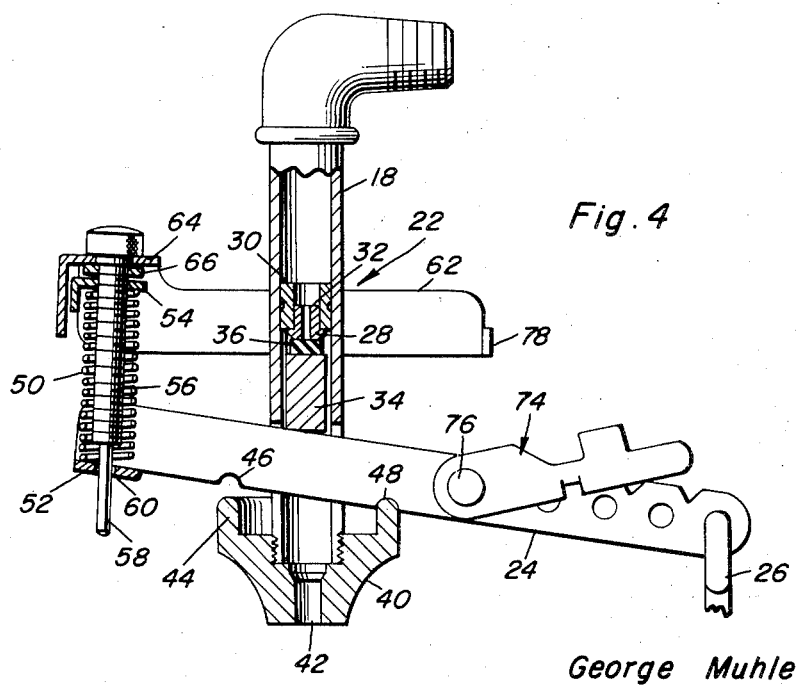
Figure 2:
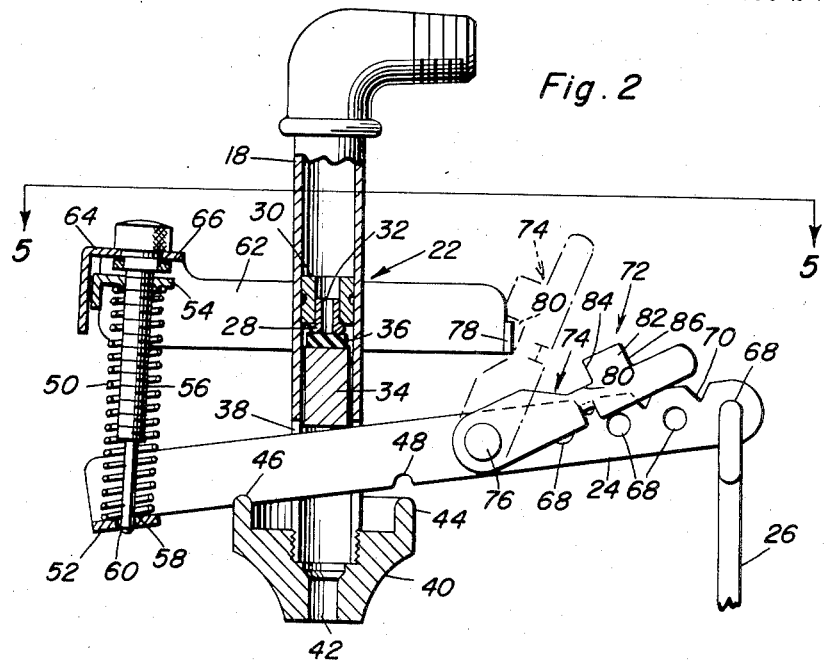
Figure 3:
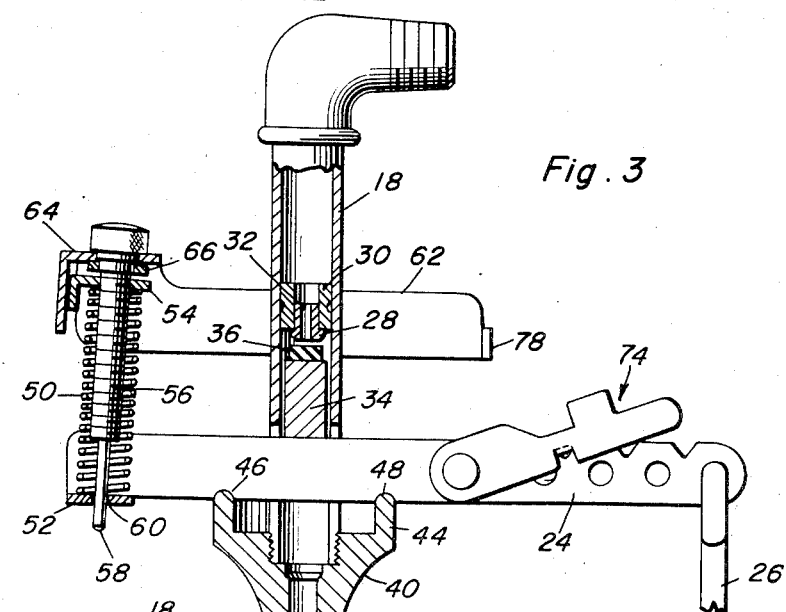
Figure 5:
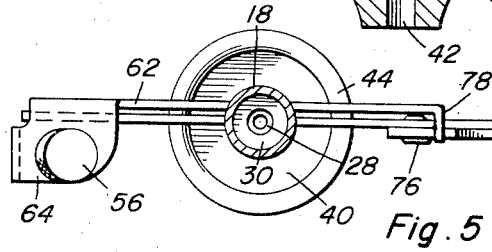

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view showing a container to be filled with water utilizing the weight control valve which is the subject of this invention and shows the container attached to the valve with the operating lever of the valve in a valve closing position due to the weight of the liquid, such as water, in the container;

Figure 2 is an enlarged fragmentary sectional view taken through the center of the valve of Figure 1 and shows the operating lever thereof in a closed position due to the urging of a spring member, there also being illustrated the details of a latch assembly for retaining the operating lever in a valve closing position, the latch assembly including a latch member shown in broken lines in inoperative position;

Figure 3 is an enlarged fragmentary sectional view similar to Figure 2 and shows the operating lever in a valve opening position and being engaged with both fulcrums;

Figure 4 is an enlarged fragmentary vertical sectional view similar to Figure 2 and shows the operating lever now shifted to a second valve closing position due to the weight imposed thereon by the container attached thereto and the liquid carried thereby; and Figure 5 is an enlarged transverse horizontal sectional view taken substantially on the plane indicated by the section line 5—5 of Figure 2, the support arm for the container being omitted for the purpose of clarity.

Referring now to the drawings in detail, it will be seen that there is illustrated the details of an automatic watering trough assembly which is referred to in general by the reference numeral 10. The watering trough assembly 10 includes a mounting block 12 on which there is hingedly mounted by means of a hinge 14 a watering pan or container 16. The watering pan 16 is aligned with a vertical water supply pipe 18 which has connected thereto a suitable water supply pipe 20. Carried by the water supply pipe 18 is a valve assembly 22 which includes an operating lever 24. Connected to the operating lever 24 in depending relation is a hanger 26 which is connected to an end of the container 16 remote from the hinge 14 and supports the same.

The valve 22 is of the weight operated type and is best illustrated in Figures 2, 3 and 4. The valve 22 includes a valve seat 28 which is mounted in the water supply pipe 18 intermediate the ends thereof. The valve seat 28 is replaceable and seated in a suitable fitting 30 carried by the water supply pipe 18. The valve seat 28 is tubular and includes a passage 32 therethrough.

Mounted within the water supply pipe 18 below the valve seat 28 is a valve member 34 which includes a seal member 36. The seal member 36 is engageable with the valve seat 28 to close the passage 32.

The operating lever 24 extends transversely of the lower end of the water supply pipe 18 and is seated in a vertical slot 38 formed in the water supply pipe 18. The operating lever 24 is so positioned whereby the valve member 34 rests thereupon. The operating lever 24 is retained within the slot 38 by means of a spout 40 carried by the lower end of the water supply pipe 18. The spout 40 includes a discharge passage 42 aligned with the pipe 18. It is also provided at its upper end with an annular flange 44 which functions as a double fulcrum for the operating lever 24. In lieu of the annular flange 44, there may be provided two separate fulcrums which would then be considered as first and second fulcrums. However, inasmuch as it is preferred that the spout 40 be threaded on the lower end of the supply pipe 18 and in order to facilitate machining, the annular flange 44 will function as the double fulcrums in any position thereof.

It is to be noted at this time that the operating lever 24 is provided intermediate its ends with a pair of seats 46 and 48. The seats 46 and 48 are configurated for the purpose of seating upon the upper edge of the flange 44, which is rounded, and thereby forms two separate pivots for the operating lever 24. The spacing between the fulcrums and the valve seat 28 is such that when the operating lever 24 is pivoted about either of the two fulcrums formed by the flange 44, the valve member 34 will be moved to a valve closing position. On the other hand, when the two seats 46 and 48 are engaged with the two fulcrums formed by the flange 44, the valve member 34 will be in a fully opened position. It is to be noted that the valve member 34 freely floats within the water supply pipe 18 and is of a size to permit the necessary flow of water therearound.

In order to compensate for the weight of the container 16 and in order to effect automatic operation of the valve 22, there is provided a spring 50. The spring 50 has the lower end thereof in engagement with a seat 52 carried by one end of the lever 24, that end being remote from the hanger 26. The opposite end of the spring 50 bears against a seat 54 which is adjustably carried by an adjusting screw 56. The adjusting screw 56 includes an elongated reduced portion 58 which passes through an opening 60 in the seat 52 to prevent kicking of the adjusting screw 56 and the spring 50 with respect to the seat 52.

In order that the adjusting screw 56 may be properly mounted, there is carried by the water supply pipe 18 in the vicinity of the fitting 50 a support arm 62. The support arm 62 includes a mounting flange 64 through which the adjusting screw 56 passes. The adjusting screw 56 is retained with respect to the mounting flange 64 by a lock washer 66. By adjusting the tension on the spring 50, the weight necessary to pivot the operating lever 24 may be varied as desired.

The end of the operating lever 24 to which the hanger 26 is attached is provided with a plurality of apertures 68 which are spaced at different distances from the seats 46 and 48. By selectively positioning the hanger 26 in one of these apertures 68, the effect of the weight of the container 16 on the operating lever 24 may be varied. Further, the upper edge of the operating lever 24 is provided with suitable notches 70 intermediate the apertures 68 for further varying the effect of the weight of the container 16 and the water carried thereby on the operating lever 24.

When the container 16 is disconnected from the operating lever 24, the spring 50 will cause it to assume the position illustrated in Figure 2. At this time, the operating lever is in a first valve closing position. When the container 16 is attached to the operating lever 24, the weight thereof may not be sufficient to cause the downward movement of the operating lever 24 from its position in Figure 2. However, the weight of the container 16 plus a minimum amount of water will be sufficient to move the operating lever 24 to the horizontal position of Figure 3 against the urgence of the spring 50. This will result in the movement of the valve member 34 to a valve opening position and the flow of water into the container 16. After the desired amount of water has been placed in the container 16, the operating lever 24 will pivot to the position illustrated in Figure 4 to a second valve closing position. The operating lever 24 will then reciprocate between the positions of Figures 3 and 4 to continuously maintain drinking water in the container 16.

The operating lever 24 also includes a latch assembly which is referred to in general by the reference numeral 72. The latch assembly 72 includes a latch member, which is referred to in general by the reference numeral 74, pivotally connected to the operating lever 24 by means of a pivot pin 76, and a keeper 78 carried by an end of the support arm 62 remote from the mounting flange 64, the keeper 78 being disposed normal to the general plane of the operating lever 24.

The valve member 74 is elongated and is provided intermediate its ends with a notch 80 and a projecting portion 82. The notch 80 forms at the lower surface of the projecting portion 82 a shoulder 84. A second shoulder 86 is disposed at the upper ends of the projecting portion 82. The latch member 74 also includes a finger 88 which is engageable with the operating lever 24 to retain it in its inoperative position shown in solid lines in Figure 2.

When it is desired to render the valve 22 inoperative, the latch member 74 is swung through the broken line position of Figure 2 so that the shoulder 80 thereof engages over the keepers 78. This prevents the downward swinging of the operating lever 24 from its position of Figure 2 and the opening of the valve assembly 22.

When it is desired to cause the flow of water into the container 16 when there is insufficient weight of water in the container 16 to actuate the operating lever 24 to move it to its position of Figure 3, the latch member 74 may be swung to a position similar to that of Figure 2, but with the shoulder 86 engaging the underside of the keeper 78. This will initially urge the operating lever 24 down to the position of Figure 3. The tension of the spring 50 will retain the latch member 74 in this position until such time as the container 16 is so filled with water whereby the operating lever 24 will pivot to the position of Figure 4 and the latch member 74 will then return to its normal position automatically. Once an initial amount of water has been placed in the container 16 in the manner described above, the operation of the valve 22 is automatic.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A weight operated valve comprising a supply pipe, a valve seat formed in said supply pipe, a valve member cooperating with said valve seat to control the flow of liquids through said supply pipe, an operating lever supporting said valve member and controlling the operation thereof, said supply pipe having an axis, fulcrums supported by said supply pipe on opposite sides of said axis, said operating lever being selectively seated on said fulcrums for operating said valve member, latch means carried by said operating lever for selectively retaining said operating lever in a valve opening and a valve closing position.

2. A weight operated valve comprising a supply pipe, a valve seat formed in said supply pipe, a valve member cooperating with said valve seat to control the flow of liquids through said supply pipe, an operating lever supporting said valve member and controlling the operation thereof, said supply pipe having an axis, fulcrums supported by said supply pipe on opposite sides of said axis, said operating lever being selectively seated on said fulcrums for operating said valve member, latch means carried by said operating lever for selectively retaining said operating lever in a valve opening and a valve closing position, said latch means including a latch member and a keeper, said latch member having first and second shoulders engageable with said keeper to position said operating lever.

3. A weight operated valve comprising a supply pipe, a valve seat formed in said supply pipe, a valve member cooperating with said valve seat to control the flow of liquids through said supply pipe, an operating lever supporting said valve member and controlling the operation thereof, said supply pipe having an axis, fulcrums supported by said supply pipe on opposite sides of said axis, said operating lever being selectively seated on said fulcrums for operating said valve member, a spring member mounted relative to said supply pipe engaging one end of said operating lever to fulcrum said operating lever about one of said fulcrums to a valve closing position, means at the opposite end of said operating lever for the attachment of a receptacle support, the spacing between said fulcrums and said valve member being such whereby when said operating lever is seated on both of said fulcrums, said valve member is in a fully open position.

4. A weight operated valve comprising a supply pipe, a valve seat formed in said supply pipe, a valve member cooperating with said valve seat to control the flow of liquids through said supply pipe, an operating lever supporting said valve member and controlling the operation thereof, said supply pipe having an axis, fulcrums supported by said supply pipe on opposite sides of said axis, said operating lever being selectively seated on said fulcrums for operating said valve member, a spring member mounted relative to said supply pipe engaging one end of said operating lever to fulcrum said operating lever about one of said fulcrums to a valve closing position, means at the opposite end of said operating lever for the attachment of a receptacle support, latch means carried by said operating lever for selectively retaining said operating lever in a valve opening and a valve closing position.

References Cited in the file of this patent

UNITED STATES PATENTS

| | | |
|---|---|---|
| 1,753,122 | Kielsmeier | Apr. 1, 1930 |
| 2,541,622 | Toaduine | Feb. 13, 1951 |
| 2,620,829 | Tolley | Dec. 9, 1952 |